(12) United States Patent
Kobayashi et al.

(10) Patent No.: US 7,099,146 B2
(45) Date of Patent: Aug. 29, 2006

(54) ELECTROLYTE FOR ELECTROCHEMICAL CAPACITOR AND ELECTROCHEMICAL CAPACITOR CONTAINING THE SAME

(75) Inventors: Yukiya Kobayashi, Kyoto (JP); Hideo Seike, Kyoto (JP); Yoshinori Takamuku, Kadoma (JP)

(73) Assignees: Sanyo Chemical Industries, Ltd., Kyoto (JP); Matsushita Electric Industrial, Co., Ltd., Kadoma (JP)

( * ) Notice: Subject to any disclaimer, the term of this patent is extended or adjusted under 35 U.S.C. 154(b) by 0 days.

(21) Appl. No.: 10/522,237

(22) PCT Filed: Jul. 28, 2003

(86) PCT No.: PCT/JP03/09522

§ 371 (c)(1),
(2), (4) Date: Sep. 21, 2005

(87) PCT Pub. No.: WO2004/017344

PCT Pub. Date: Feb. 26, 2004

(65) Prior Publication Data

US 2006/0087798 A1    Apr. 27, 2006

(30) Foreign Application Priority Data

Jul. 26, 2002  (JP)  ............... 2002-218414
Jul. 24, 2003  (JP)  ............... 2003-201349

(51) Int. Cl.
*H01G 9/00*  (2006.01)
*H01G 9/02*  (2006.01)

(52) U.S. Cl. ............ 361/523; 361/525; 361/527; 361/528; 361/529; 361/503; 29/25.03; 252/62.2

(58) Field of Classification Search ........ 361/523–525, 361/527–530, 502–512, 516; 29/25.03; 252/62.2
See application file for complete search history.

(56) References Cited

U.S. PATENT DOCUMENTS 4,892,944 A * 1/1990 Mori et al. ............... 544/107
5,870,275 A   2/1999 Shiono et al.
6,166,899 A * 12/2000 Tamamitsu ............... 361/504
6,307,733 B1 * 10/2001 Maruyama et al. ....... 361/511
6,452,784 B1 *  9/2002 Nakada et al. ............ 361/509
6,493,211 B1 * 12/2002 Sugiyama et al. ......... 361/504

FOREIGN PATENT DOCUMENTS

| EP | 0 684 620 B1 | 11/1995 |
| JP | 2000-232037 | 8/2000 |
| JP | 2000-281657 | 10/2000 |
| JP | 2000-311839 | 11/2000 |
| WO | WO95/15572 | 6/1995 |

* cited by examiner

*Primary Examiner*—Nguyen T. Ha
(74) *Attorney, Agent, or Firm*—Westerman, Hattori, Daniels & Adrian, LLP.

(57) ABSTRACT

The present invention is to provide
an electrolyte with which the withstand voltage and capacitor capacity can be prevented from lowering, and an electrochemical capacitor containing the same.

The present invention uses
an electrolyte for an electrochemical capacitor comprising a cyclic amidinium salt (B) represented by the general formula (1),
wherein the total amount of a cyclic amidinium salt derivative (A) represented by the general formula (2) is not larger than 10 mole % relative to the sum of (A) and (B).

$$R^1-C\!=\!\!=\!\!N-R^2 \atop R^2-N\underline{\phantom{xx}}Q \quad X^- \qquad (1)$$

$$R^3-C\!=\!\!=\!\!N-R^4 \atop R^4-N\underset{Y_n}{\underline{\phantom{xx}}}Q \quad X^- \qquad (2)$$

19 Claims, No Drawings

ELECTROLYTE FOR ELECTROCHEMICAL CAPACITOR AND ELECTROCHEMICAL CAPACITOR CONTAINING THE SAME

TECHNICAL FIELD

The present invention relates to an electrolyte for electrochemical capacitor and an electrochemical capacitor containing the same. The electrochemical capacitor includes electric double layer capacitors, aluminum electrolytic capacitors, pseudocapacitors (redox capacitors), and cells having an ionic charge transfer-base charge/discharge mechanism. More particularly, the invention relates to an electrochemical capacitor high in withstand voltage and in energy density and used as a memory backup in various electronic devices and as a power source for a high current-requiring electric vehicle, and to an electrolyte to be used therein.

BACKGROUND ART

Electrochemical capacitors using a nonaqueous electrolyte are advantageous in that the withstand voltage can be increased, and thus the energy density can be increased as compared with electrochemical capacitors using an aqueous electrolyte. They have been rapidly spread as backup power sources for household electronic devices. Particularly, in those electrochemical capacitors used for electric power systems such as electric vehicles, hybrid vehicles and electric power storage having an electrostatic capacity of 50 F or higher, which have attracted attention in recent years, nonaqueous electrolyte-based ones are suited.

A nonaqueous electrolyte comprising a solution of a cyclic amidinium salt in propylene carbonate as a solvent has been put into practical use for electrochemical capacitors (e.g. WO 95/15572).

SUMMARY OF THE INVENTION

However, electrochemical capacitors containing such a nonaqueous electrolyte have problems, namely their withstand voltage is often insufficient and their capacity lowers with the lapse of time. It is an object of the present invention to provide a nonaqueous electrolyte with which the withstand voltage and capacitor capacity can be prevented from lowering, and an electrochemical capacitor containing the same.

The present inventors have made intensive investigations in view of such circumstances, and as a result, they found that the factor causing such problems is an impurity contained in the electrolyte, in particular a cyclic amidinium salt derivative (A) represented by the general formula (2) given below, which is derived from the corresponding cyclic amidinium salt and that the withstand voltage and capacitor capacity can be prevented from lowering by reducing the content of that substance. These findings have now led to completion of the present invention. It is quite unknown in the art that such an impurity may affect the performance characteristics of electrochemical capacitors, in particular electric double layer capacitors.

Thus, the present invention relates to an electrolyte for an electrochemical capacitor comprising a cyclic amidinium salt (B) represented by the general formula (1), wherein the total amount of a cyclic amidinium salt derivative (A) represented by the general formula (2) is not larger than 10 mole % relative to the sum of (A) and (B):

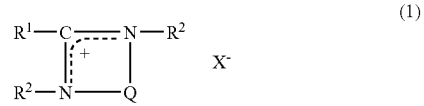

[In the formula, $R^1$ represents a hydrogen atom or a hydrocarbon group containing 1 to 20 carbon atoms, which may optionally have a hydroxyl group(s), $R^2$ represents a hydrocarbon group containing 1 to 10 carbon atoms, which may optionally have a hydroxyl group, amino group, nitro group, cyano group, formyl group and/or ether bond-containing group(s), and the two $R^2$ groups may be the same or different, Q represents an alkylene, arylene or alkenylene group containing 2 to 10 carbon atoms, which may optionally have a hydrocarbon group containing 1 to 5 carbon atoms, an amino, nitro, cyano or formyl group(s), and $X^-$ represents a counter anion; the part or whole of the $R^1$ and $R^2$ moieties may be bound together to form a ring.];

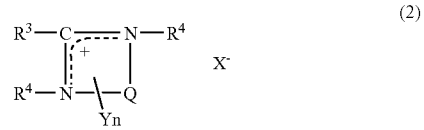

[In the formula, $R^3$ represents a hydrogen atom or a hydrocarbon group containing 1 to 20 carbon atoms, which may be substituted with a hydroxyl group(s), $R^4$ represents a hydrocarbon group containing 1 to 10 carbon atoms, which may have a hydroxyl, amino, nitro, cyano, formyl and/or ether bond-containing group(s), and the two $R^4$ groups may be the same or different; Q represents an alkylene, arylene or alkenylene group containing 2 to 10 carbon atoms, which may optionally have a hydrocarbon group containing 1 to 5 carbon atoms, an amino, nitro, cyano or formyl group(s), and there are cases where there is $X^-$ or there is no $X^-$ and, when there is $X^-$, it represents a counter anion, and each Y represents a carboxyl group or an $—OCO_2H$ and, when there is no $X^-$, each Y represents a carboxyl group, a carboxyl anion group, an $—OCO_2H$ or $—OCO_2^-$ group and one Y represents a carboxyl anion or an $—OCO_2^-$ group; n represents an integer of 1 to 20; the part or whole of the $R^3$ and $R^4$ moieties may be bound together to form a ring.];

an electrochemical capacitor having a polarizable electrode impregnated with an electrolyte which contains the above-mentioned electrolyte for an electrochemical capacitor as the electrolyte, and in which at least one of the positive and negative electrodes is a polarizable electrode comprising a carbonaceous material as the main component; and an electric double layer capacitor having a polarizable electrode impregnated with an electrolyte which is producible by using the above-mentioned electrolyte for an electrochemical capacitor as the electrolyte.

In the following, the present invention is described in detail.

DETAILED DESCRIPTION OF THE INVENTION

The total amount of (A) in the electrolyte according to the invention is required to be not larger than 10 mole % relative to the sum of (A) and (B). When the content of (A) exceeds 10 mole %, the withstand voltage may decrease and/or a decrease in capacitor capacity may result. The content of (A) in the electrolyte is preferably not higher than 5 mole %, more preferably not higher than 1 mole %, most preferably not higher than 0.1 mole %. The electrolyte may be quite free of (A); thus, the lower limit to the content of (A) may be 0 (zero) mole % or higher.

The cyclic amidinium salt (B) to be used in the electrolyte of the invention is generally obtainable by quaternizing the corresponding tertiary cyclic amidine with a carbonate ester such as dialkyl carbonate and subjecting the resulting carbonate ester salt to exchange for an appropriate acid anion. In the course of these reactions, carbon dioxide coexisting in the reaction system reacts with the cyclic amidinium salt to give (A) as a byproduct, so that the reaction system inevitably contains (A) as an impurity. Therefore, the electrolyte prepared by dissolving such cyclic amidinium salts as solutes in a solvent contains (A).

As for the method of analyzing the content of (A) as defined herein, the electrolyte sample is first analyzed by $^1$H-NMR and $^{13}$C-NMR to identify the species of (A) contained therein. In case the content of (A) is low, (A) may be isolated by preparative chromatography, for instance, for analyzing the same. The $^1$H-NMR measurement conditions are, for example, as follows. Apparatus: AVANCE 300 (product of Bruker Japan Co., Ltd.), solvent: dimethyl sulfoxide. The $^{13}$C-NMR measurement conditions are, for example, as follows. Apparatus: AL-300.(product of JEOL, Ltd.), solvent: dimethyl sulfoxide. Then, the content is determined by high performance liquid chromatography (hereinafter abbreviated as HPLC). For the measurement, the electrolyte is 100-fold (on the weight basis) diluted with the mobile phase solvent for HPLC as specified below. The above-mentioned fraction (A) is isolated by preparative chromatography, for instance, a working curve is constructed, and the content is calculated using the curve. The HPLC measurement conditions are, for example, as follows. Apparatus: model (LC-10A), manufacturer (Shimadzu Corporation), column: CAPCELL PAC UG120C$_{18}$ (4.6 mmϕ× 25 cm), manufacturer (Shiseido Co., Ltd.), mobile phase: aqueous solution with a phosphoric acid concentration of 10 mmol/l and a sodium perchlorate concentration of 100 mmol/l, flow rate: 0.8 ml/min, detector: UV (210 nm), injection amount: 20 μl, column temperature: 40° C.

The cyclic amidinium salt (B) to be used in the practice of the invention is represented by the general formula (1) given hereinabove. The counter anion X$^-$ in (B) includes inorganic anions and organic anions. The inorganic anions include $BO_3^{3-}$, $F^-$, $PF_6^-$, $BF_4^-$, $AsF_6^-$, $SbF_6^-$, $ClO_4^-$, $AlF_4^-$, $AlCl_4^-$, $TaF_6^-$, $NbF_6^-$, $SiF_6^{2-}$, $CN^-$ and $F(HF)_n^-$ (in which n represents a numerical value of not less than 1 but not more than 4); among them, $PF_6^-$, $BF_4^-$, $AsF_6^-$ and $SbF_6^-$ are preferred. The organic anions include, among others, anions selected from the group consisting of $N(RfSO_2)_2^-$, $C(RfSO_2)_3^-$, $RfCOO^-$ and $RfSO_3^-$ (Rf being a fluoroalkyl group containing 1 to 12 carbon atoms), and anions resulting from hydrogen atom removal from the acids enumerated below.

Carboxylic Acids

Dibasic to tetrabasic polycarboxylic acids containing 2 to 15 carbon atoms: aliphatic polycarboxylic acids [saturated polycarboxylic acids (oxalic acid, malonic acid, succinic acid, glutaric acid, adipic acid, pimelic acid, suberic acid, azelaic acid, sebacic acid, undecanedioic acid, dodecanedioic acid, tridecanedioic acid, tetradecanedioic acid, pentadecanedioic acid, hexadecanedioic acid, methylmalonic acid, ethylmalonic acid, propylmalonic acid, butylmalonic acid, pentylmalonic acid, hexylmalonic acid, dimethylmalonic acid, diethylmalonic acid, methylpropylmalonic acid, methylbutylmalonic acid, ethylpropylmalonic acid, dipropylmalonic acid, methylsuccinic acid, ethylsuccinic acid, 2,2-dimethylsuccinic acid, 2,3-dimethylsuccinic acid, 2-methylglutaric acid, 3-methylglutaric acid, 3-methyl-3-ethylglutaric acid, 3,3-diethylglutaric acid, methylsuccinic acid, 2-methylglutaric acid, 3-methylglutaric acid, 3,3-dimethylglutaric acid, 3-methyladipic acid, etc), unsaturated polycarboxylic acids (maleic acid, fumaric acid, itaconic acid, citraconic acid, etc.)], aromatic polycarboxylic acids [phthalic acid, isophthalic acid, terephthalic acid, trimellitic acid, pyromellitic acid, etc.], S-containing polycarboxylic acids [thiodipropionic acid, etc.];

Hydroxycarboxylic acid containing 2 to 20 carbon atoms: aliphatic hydroxycarboxylic acids [glycolic acid, lactic acid, tartaric acid, castor oil fatty acids, etc.]; aromatic hydroxycarboxylic acids [salicylic acid, mandelic acid, 4-hydroxybenzoic acid, 1-hydroxy-2-naphthoic acid, 3-hydroxy-2-naphthoic acid, 6-hydroxy-2-naphthoic acid, etc.];

Monocarboxylic acids containing 1 to 30 carbon atoms: aliphatic monocarboxylic acids saturated monocarboxylic acids (formic acid, acetic acid, propionic acid, butyric acid, isobutyric acid, valeric acid, caproic acid, enanthic acid, caprylic acid, pelargonic acid, lauric acid, myristic acid, stearic acid, behenic acid, undecanoic acid, etc.), unsaturated monocarboxylic acids (acrylic acid, methacrylic acid, crotonic acid, oleic acid, etc.); aromatic monocarboxylic acids [benzoic acid, cinnamic acid, naphthoic acid, toluic acid, ethylbenzoic acid, propylbenzoic acid, isopropylbenzoic acid, butylbenzoic acid, isobutylbenzoic acid, sec-butylbenzoic acid, tert-butylbenzoic acid, hydroxybenzoic acid, ethoxybenzoic acid, propoxybenzoic acid, isopropoxybenzoic acid, butoxybenzoic acid, isobutoxybenzoic acid, sec-butoxybenzoic acid, tert-butoxybenzoic acid, aminobenzoic acid, N-methylaminobenzoic acid, N-ethylaminobenzoic acid, N-propylaminobenzoic acid, N-isopropylaminobenzoic acid, N-butylaminobenzoic acid, N-isobutylaminobenzoic acid, N-sec-butylaminobenzoic acid, N-tert-butylaminobenzoic acid, N,N-dimethylaminobenzoic acid, N,N-diethylaminobenzoic acid, nitrobenzoic acid, fluorobenzoic acid, etc.].

Phenols

Monohydric phenols (including phenols and naphthols): phenol, alkyl(C1 to 15)phenols (cresol, xylenol, ethylphenol, n- or isopropylphenol, isododecylphenol, etc.), methoxyphenols (eugenol, guaiacol, etc.), α-naphthol, β-naphthol, cyclohexylphenol, etc.;

Polyhydric phenols: catechol, resorcin, pyrogallol, phloroglucinol, bisphenol A, bisphenol F, bisphenol S, etc.

Mono- and dialkyl phosphates with each alkyl group containing 1 to 15 carbon atoms Mono- and dimethyl phosphate, mono- and diisopropyl phosphate, mono- and dibutyl phosphate, mono- and di-(2-ethylhexyl)phosphate, mono- and diisodecyl phosphate, etc.

Sulfonic Acids

Alkyl(C1 to 15)benzenesulfonic acids (p-toluenesulfonic acid, nonylbenzenesulfonic acid, dodecylbenzenesulfonic acid, etc.), sulfosalicylic acid, methanesulfonic acid, trifluoromethanesulfonic acid, etc. Triazole or tetrazole skeleton-containing compounds 1H-1,2,4-triazole, 1,2,3-triazole, 1,2,3-benzotriazole, carboxybenzotriazole, 3-mercapto-1,2,4-triazole, 1,2,3-triazole-4,5-dicarboxylic acid, 3-mercapto-5-methyl-1,2,4-triazole, 1,2,3,4-tetrazole, etc.

Boron-containing Compounds

Borodioxalic acid, borodiglycolic acid, borodi(2-hydroxyisobutyric acid)

Alkaneboric acids, arylboric acids

Methaneboric acid, ethaneboric acid, phenylboric acid, etc.

Anions represented by the following formula

[(Rf)$_n$BF$_{4-n}$]$^-$ (in the formula, n represents an integer of 1 to 4 and Rf represents a fluoroalkyl group containing 1 to 12 carbon atoms)

Trifluoromethyl trifluoroborate, bis(trifluoromethyl)difluoroborate, tris(trifluoromethyl)fluoroborate, tetrakis(trifluoromethyl)borate, pentafluoroethyl trifluoroborate, bis(pentafluoroethyl)difluoroborate, tris(pentafluoroethyl)fluoroborate, tetrakis(pentafluoroethyl)borate, etc.

Anions represented by the general formula (5):

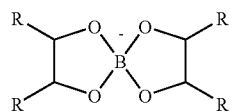

[In the formula, each R represents a hydrocarbon group containing 1 to 10 carbon atoms, which may optionally contain a hydroxyl, amino, nitro, cyano, chloro, fluoro and/or formyl group(s) and/or an ether bond-containing group(s), or a hydrogen or fluorine atom, and the Rs may be the same or different; the part or whole of the Rs may be bound together to form a ring or rings.]

Anions represented by the general formula (6):

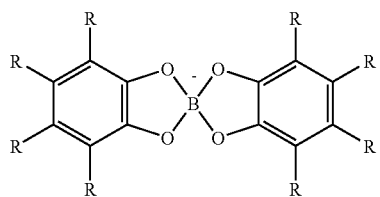

[In the formula, each R represents a hydrocarbon group containing 1 to 10 carbon atoms, which may optionally contain a hydroxyl, amino, nitro, cyano, chloro, fluoro and/or formyl group(s) and/or an ether bond-containing group(s), or a hydrogen or fluorine atom, and the Rs may be the same or different; the part or whole of Rs may be bound together to form a ring or rings.]

Preferred among these are anions selected from the group consisting of N(RfSO$_2$)$_2^-$, C(RfSO$_2$)$_3^-$ and RfSO$_3^-$ (Rf being a fluoroalkyl group containing 1 to 12 carbon atoms) and anions derived from maleic acid, phthalic acid and salicylic acid each resulting from a hydrogen atom removal.

Referring to the general formula (1) representing cyclic amidinium salts (B), $R^1$ represents a hydrogen atom or a hydrocarbon group containing 1 to 20 carbon atoms, which may optionally have a hydroxyl group(s), preferably a hydrogen atom or a hydrocarbon group containing 1 to 10 carbon atoms, more preferably a hydrogen atom or a hydrocarbon group containing 1 to 5 carbon atoms, still more preferably a hydrogen atom or a hydrocarbon group containing 1 to 3 carbon atoms.

Referring to the general formula (1) representing cyclic amidinium salts (B), each $R^2$ represents a hydrocarbon group containing 1 to 10 carbon atoms, which may optionally have a hydroxyl, amino, nitro, cyano and/or formyl group(s) and/or an ether bond-containing group(s), and the two $R^2$ moieties may be the same or different. It is preferably a hydrocarbon group containing 1 to 5 carbon atoms, more preferably a hydrocarbon group containing 1 to 3 carbon atoms. The part or whole of the $R^1$ and $R^2$ moieties may be bound together to form a ring.

Referring to the general formula (1) representing cyclic amidinium salts (B) and the general formula (2) representing cyclic amidinium salt derivatives (A), Q represents an alkylene, arylene or alkenylene group, which may optionally have a hydrocarbon group(s) containing 1 to 5 carbon atoms, an amino, nitro, cyano and/or formyl group(s). Q is preferably one giving a 5-membered or 6-membered ring-forming cation in the cyclic amidinium salt (B). When Q— is a CH═CH— group, for instance, the cation of the cyclic amidinium salt (B) is an imidazolium cation.

The cation of the cyclic amidinium salt (B) to be used in the practice of the invention includes, for example, the following.

Tetrahydropyrimidinium type cations:

1,3-Dimethyl-1,4,5,6-tetrahydropyrimidinium, 1,2,3-trimethyl-1,4,5,6-tetrahydropyrimidinium, 1,3,4-trimethyl-1,4,5,6-tetrahydropyrimidinium, 1,3,5-trimethyl-1,4,5,6-tetrahydropyrimidinium, 1-ethyl-2,3-dimethyl-1,4,5,6-tetrahydropyrimidinium, 1-ethyl-3,4-dimethyl-1,4,5,6-tetrahydropyrimidinium, 1-ethyl-3,5-dimethyl-1,4,5,6-tetrahydropyrimidinium, 1-ethyl-3,6-dimethyl-1,4,5,6-tetrahydropyrimidinium, 2-ethyl-1,3-dimethyl-1,4,5,6-tetrahydropyrimidinium, 4-ethyl-1,3-dimethyl-1,4,5,6-tetrahydropyrimidinium, 5-ethyl-1,3-dimethyl-1,4,5,6-tetrahydropyrimidinium, 1,2,3,4-teramethyl-1,4,5,6-tetrahydropyrimidinium, 1,2,3,5-tetramethyl-1,4,5,6-tetrahydropyrimidinium, 1-ethyl-2,3,4-trimethyl-1,4,5,6-tetrahydropyrimidinium, 1-ethyl-2,3,5-trimethyl-1,4,5,6-tetrahydropyrimidinium, 1-ethyl-2,3,6-trimethyl-1,4,5,6-tetrahydropyrimidinium, 2-ethyl-1,3,4-trimethyl-1,4,5,6-tetrahydropyrimidinium, 2-ethyl-1,3,5-trimethyl-1,4,5,6-tetrahydropyrimidinium, 4-ethyl-1,2,3-trimethyl-1,4,5,6-tetrahydropyrimidinium, 4-ethyl-1,3,5-trimethyl-1,4,5,6-tetrahydropyrimidinium, 4-ethyl-1,3,6-trimethyl-1,4,5,6-tetrahydropyrimidinium, 5-ethyl-1,2,3-trimethyl-1,4,5,6-tetrahydropyrimidinium, 5-ethyl-1,3,4-trimethyl-1,4,5,6-tetrahydropyrimidinium, 1,2-diethyl-3,4-dimethyl-1,4,5,6-tetrahydropyrimidinium, 1,2-diethyl-3,5-dimethyl-1,4,5,6-tetrahydropyrimidinium, 1,2-diethyl-3,6-dimethyl-1,4,5,6-tetrahydropyrimidinium, 1,3-diethyl-2,4-dimethyl-1,4,5,6-tetrahydropyrimidinium, 1,3-diethyl-2,5-dimethyl-1,4,5,6-tetrahydropyrimidinium, 1,4-diethyl-2,3-dimethyl-1,4,5,6-tetrahydropyrimidinium, 1,4-diethyl-3,5-dimethyl-1,4,5,6-tetrahydropyrimidinium, 1,4-diethyl-3,6-dimethyl-1,4,5,6-tetrahydropyrimidinium, 1,5-diethyl-2,3-dimethyl-1,4,5,6-tetrahydropyrimidinium, 1,5-diethyl-3,4-dimethyl-1,4,5,6-tetrahydropyrimidinium, 1,5-diethyl-3,6-dimethyl-1,4,5,6-tetrahydropyrimidinium, 2,4-diethyl-1,3-dimethyl-1,4,5,6-tetrahydropyrimidinium, 2,5-diethyl-1,3-dimethyl-1,4,5,6-tetrahydropyrimidinium, 4,5-diethyl-1,3-dimethyl-1,4,5,6-tetrahydropyrimidinium, 4,6-diethyl-1,3-dimethyl-1,4,5,6-tetrahydropyrimidinium, 1,2,3,4,5-pentamethyl-1,4,5,6-tetrahydropyrimidinium, 1,2,3,4,6-pentamethyl-1,4,5,6- tetrahydropyrimidinium, 1,2,3,4,5,6-hexamethyl-1,4,5,6-tetrahydropyrimidinium, 8-methyl-1,8-diazabicyclo[5.4.0]-7-undecenium, 8-ethyl-1,8-diazabicyclo[5.4.0]-7-undecenium, 5-methyl-1,5-diazabicyclo[5.4.0]-5-undecenium, 5-ethyl-1,5-diazabicyclo[5.4.0]-5-undecenium, 5-methyl-1,5-diazabicyclo[4.3.0]-5-nonenium, 5-ethyl-1,5-diazabicyclo[4.3.0]-5-nonenium, etc.

Imidazolinium type cations:

1,2,3-Trimethylimidazolinium, 1,3,4-trimethylimidazolinium, 1,2,3,4-tetramethylimidazolinium, 1,2,3,4-tetraethylimidazolinium, 1,2,3,5-pentamethylimidazolinium, 1,3-dimethyl-2-ethylimidazolinium, 1-ethyl-2,3-dimethylimidazolinium, 1-ethyl-3,4-dimethylimidazolinium, 1-ethyl-3,5-dimethylimidazolinium, 4-ethyl-1,3-dimethylimidazolinium, 1,2-diethyl-3-methylimidazolinium, 1,4-diethyl-3-methylimidazolinium, 1,5-diethyl-3-methylimidazolinium, 1,3-diethyl-2-methylimidazolinium, 1,3-diethyl-4-methylimidazolinium, 1,2,3-triethylimidazolinium, 1-ethyl-2,3,4-trimethylimidazolinium, 1-ethyl-2,3,5-trimethylimidazolinium, 1-ethyl-3,4,5-trimethylimidazolinium, 2-ethyl-1,3,4-trimethylimidazolinium, 4-ethyl-1,2,3-trimethylimidazolinium, 1,2-diethyl-3,4-dimethylimidazolinium, 1,3-diethyl-2,4-dimethylimidazolinium, 1,4-diethyl-2,3-dimethylimidazolinium, 2,4-diethyl-1,3-dimethylimidazolinium, 4,5-diethyl-1,3-dimethylimidazolinium, 3,4-diethyl-1,2-dimethylimidazolinium, 1,2,3-triethyl-4-methylimidazolinium, 1,2,4-triethyl-3-methylimidazolinium, 1,2,5-triethyl-3-methylimidazolinium, 1,3,4-triethyl-2-methylimidazolinium, 1,3,4-triethyl-5-methylimidazolinium, 1,4,5-triethyl-3-methylimidazolinium, 2,3,4-triethyl-1-methylimidazolinium, 1,1-dimethyl-2-heptylimidazolinium, 1,1-dimethyl-2-(2'-heptyl)imidazolinium, 1,1-dimethyl-2-(3'-heptyl)imidazolinium, 1,1-dimethyl-2-(4'-heptyl)imidazolinium, 1,1-dimethyl-2-dodecylimidazolinium, 1,1-dimethylimidazolinium, 1,1,2-trimethylimidazolinium, 1,1,2,4-tetramethylimidazolinium, 1,1,2,5-tetramethylimidazolinium, 1,1,2,4,5-pentamethylimidazolinium, etc.

Imidazolium type cations:

1,3-Dimethylimidazolium, 1-ethyl-3-methylimidazolium, 1,3-diethylimidazolium, 1,2,3-trimethylimidazolium, 1,3,4-trimethylimidazolium, 1-ethyl-2,3-dimethylimidazolium, 1-ethyl-3,4-dimethylimidazolium, 1-ethyl-3,5-dimethylimidazolium, 2-ethyl-1,3-dimethylimidazolium, 4-ethyl-1,3-dimethylimidazolium, 1,2-diethyl-3-methylimidazolium, 1,4-diethyl-3-methylimidazolium, 1,5-diethyl-3-methylimidazolium, 1,3-diethyl-2-methylimidazolium, 1,3-diethyl-4-methylimidazolium, 1,2,3-triethylimidazolium, 1,2,3-triethylimidazolium, 1,3,4-triethylimidazolium, 1,2,3,4-tetramethylimidazolium, 1-ethyl-2,3,4-trimethylimidazolium, 1-ethyl-2,3,5-trimethylimidazolium, 1-ethyl-3,4,5-trimethylimidazolium, 2-ethyl-1,3,4-trimethylimidazolium, 4-ethyl-1,2,3-trimethylimidazolium, 1,2-diethyl-3,4-dimethylimidazolium, 1,3-diethyl-2,4-dimethylimidazolium, 1,4-diethyl-2,3-dimethylimidazolium, 1,4-diethyl-2,5-dimethylimidazolium, 2,4-diethyl-1,3-dimethylimidazolium, 4,5-diethyl-1,3-dimethylimidazolium, 3,4-diethyl-1,2-dimethylimidazolium, 2,3,4-triethyl-1-methylimidazolium, 1,2,3-triethyl-4-methylimidazolium, 1,2,4-triethyl-3-methylimidazolium, 1,2,5-triethyl-3-methylimidazolium, 1,3,4-triethyl-2-methylimidazolium, 1,3,4-triethyl-5-methylimidazolium, 1,4,5-triethyl-3-methylimidazolium, 1,2,3,4-tetraethylimidazolium, 1,1-dimethyl-2-heptylimidazolium, 1,1-dimethyl-2-(2'-heptyl)imidazolium, 1,1-dimethyl-2-(3'-heptyl)imidazolium, 1,1-dimethyl-2-(4'-heptyl)imidazolium, 1,1-dimethyl-2-dodecylimidazolium, 1,1-dimethylimidazolium, 1,1,2-trimethylimidazolium, 1,1,2,4-tetramethylimidazolium, 1,1,2,5-tetramethylimidazolium, 1,2,3,4,5-pentamethylimidazolium, 1,1,2,4,5-pentamethylimidazolium, etc.

Specific examples of (B) include, for example, 1,3-dimethylimidazolium tetrafluoroborate, 1-ethyl-3-methylimidazolium tetrafluoroborate, 1-butyl-3-methylimidazolium tetrafluoroborate, 1,2,3-trimethylimidazolium tetrafluoroborate, 1-ethyl-2,3-dimethylimidazolium tetrafluoroborate, 1,3-dimethylimidazolium hexafluorophosphate, 1-ethyl-3-methylimidazolium hexafluorophosphate, 1-butyl-3-methylimidazolim hexafluorophosphate, 1-ethyl-3-methylimidazolium monomaleate, 1-ethyl-3-methylimidazolium monophthalate, 1,3-dimethylimidazolium monomaleate, 1,3-dimethylimidazolium monophthalate, and the like.

The solvent to be used in the electrolyte of the invention may be any of those known in the art and is generally selected depending on the solubility and electrochemical stability of the electrolyte. Particularly, nonaqueous solvents are preferred. Specific examples include the following. Two or more of these may be used in combination.

Ethers: chain ethers [containing 2 to 6 carbon atoms (diethyl ether, methyl isopropyl ether, ethylene glycol dimethyl ether, diethylene glycol dimethyl ether, etc.); containing 7 to 12 carbon atoms (diethylene glycol diethyl ether, triethylene glycol dimethyl ether, etc.)], cyclic ethers [containing 2 to 4 carbon atoms (tetrahydrofuran, 1,3-dioxolane, 1,4-dioxolane, etc.); containing 5 to 18 carbon atoms (4-butyldioxolane, crown ethers, etc.)].

Amides: N,N-dimethylformamide, N,N-dimethylacetamide, N,N-dimethylpropionamide, hexamethylphosphorylamide, N-methylpyrrolidone, etc.

Carboxylic acid esters: methyl acetate, methyl propionate, etc.

Lactones; γ-butyrolactone, α-acetyl-γ-butyrolactone, β-butyrolactone, γ-valerolactone, δ-valerolactone, etc.

Nitriles: acetonitrile, glutaronitrile, adiponitrile, methoxyacetonitrile, 3-methoxypropionitrile, acrylonitrile, etc.

Carbonates: ethylene carbonate, propylene carbonate, butylene carbonate, vinylene carbonate, dimethyl carbonate, ethyl methyl carbonate, diethyl carbonate, etc.

Sulfoxides: dimethyl sulfoxide, sulfolane, 3-methylsulfolane, 2,4-dimethylsulfolane, etc.

Nitro compounds: nitromethane, nitroethane, etc.

Heterocyclic solvents: N-methyl-2-oxazolidinone, 3,5-dimethyl-2-oxazolidinone, 1,3-dimethyl-2-imidazolidinone, N-methylpyrrolidinone, etc.

Preferred among these are solvents comprising, as the main component, at least one species selected from the group consisting of propylene carbonate, ethylene carbonate, butylene carbonate, sulfolane, 3-methylsulfolane, acetonitrile, dimethyl carbonate, ethyl methyl carbonate and diethyl carbonate. The phrase "comprising, as the main component" as used herein means that the main component solvent accounts for not less than 50% by weight, preferably not less than 70% by weight, of the whole solvent.

More preferred are carbonates and sulfoxides. Most preferred are ethylene carbonate, propylene carbonate and sulfolane.

From the viewpoint of electric conductivity and/or internal resistance of the electrolyte, the concentration of (B) in the electrolyte is preferably not lower than 0.1 mole/liter, more preferably not lower than 0.5 mole/liter. From the viewpoint of salt deposition at low temperatures, it is preferably not higher than 5 moles/liter, more preferably not higher than 4 moles/liter.

The compound (A) defined herein is a compound resulting from addition of a substituent group represented by Y (a carboxyl group, carboxyl anion group, —$OCO_2H$ group or —$OCO_2^-$ group) to such an amidine compound as given hereinabove as an example of the cation of (B) and includes the case where a counter anion $X^-$ is contained and the case where a counter anion $X^-$ is not contained. The counter anion $X^-$ includes the same ones as enumerated hereinabove as the counter anion $X^-$ in (B). In cases where there is $X^-$, Y is a carboxyl group or —$OCO_2H$ group and, in cases where there is no $X^-$, Y is a carboxyl group, carboxyl anion group, —$OCO_2H$ group or —$OCO_2^-$ group, and one of the Y groups is a carboxyl anion or —$OCO_2^-$ group. When the amidinium ring is an imidazolium ring, for instance, the positions for the substitution of Y are the carbon in position 4, the carbon in position 5, etc.

Referring to the general formula (2) representing the cyclic amidinium salt derivative (A), $R^3$ includes the same ones as represented by $R^1$, and $R^4$ includes the same ones as represented by $R^2$. In the general formula (2), n represents an integer of 1 to 20, preferably an integer of 1 to 10, more preferably an integer of 1 to 5, and still more preferably 1 or 2.

Specific examples of (A) include the following.

Those having no counter ion include:

1-Ethyl-3-methylimidazolium-4-carboxyl anion betaine, 1-ethyl-3-methylimidazolium-5-carboxyl anion betaine, 1-ethyl-3-methylimidazolium-4-carboxyl anion betaine-5-carboxylic acid, 1-ethyl-3-methylimidazolium-5-carboxyl anion betaine-4-carboxylic acid and the like, and further those compounds resulting from substitution of the carboxyl group or carboxyl anion group of the compounds mentioned above with an —$OCO_2H$ or —$OCO_2^-$ group, respectively.

Those having a counter anion include:

1-Ethyl-3-methylimidazolium-4-carboxyl tetrafluoroborate, 1-ethyl-3-methylimidazolium-5-carboxyl tetrafluoroborate and 1-ethyl-3-methylimidazolium-4,5-dicarboxyl tetrafluoroborate, and further those compounds resulting from substitution of the carboxyl group of the compounds mentioned above with an —$OCO_2H$ group.

Further included are the compounds resulting from substitution of the above-mentioned tetrafluoroborate $BF_4^-$ with those counter anions $X^-$ mentioned hereinabove referring to (B).

Other examples include those compounds resulting from addition of a carboxyl group, carboxyl anion group, an —$OCO_2H$ group or —$OCO_2^-$ group to the cations or salts thereof enumerated hereinabove referring to (B) (the counter anions $X^-$ including the same ones as the counter anions $X^-$ mentioned hereinabove as examples of (B)).

The method of reducing the content of (A) to a very low level as defined herein includes the method comprising inhibiting the formation of (A) as a byproduct in the process of producing (B) and the method comprising removing (A) after the production of (B).

As the method of inhibiting the formation of byproduct (A) in the process of production, there may be mentioned the method comprising reducing the concentration of carbon dioxide in the reaction system during the reaction. Generally, (B) is obtainable by reacting a tertiary amidine salt with a dialkyl carbonate, such as dimethyl carbonate, in a protic polar solvent, such as methanol, under pressure at a temperature of 100 to 180° C. Under such conditions, carbon dioxide is formed as a byproduct by the reaction of the dialkyl carbonate with water occurring in the system or by the decomposition of the cyclic amidinium salt monoalkyl carbonate salt obtained by the reaction, and this carbon dioxide reacts with the cyclic amidinium salt to give (A) as a byproduct. Therefore, by reducing the chances of reaction of the carbon dioxide with the cyclic amidinium salt, it becomes possible to suppress the formation of (A) as a byproduct. More specifically, there may be mentioned the method comprising increasing the amount of the solvent, such as methanol, to thereby decrease the carbon dioxide concentration in the reaction system, the method comprising carrying out the reaction while eliminating carbon dioxide in the reaction system out of the system, and the like. For the elimination of carbon dioxide in the reaction system out of the system, the pressure increased by gas generation during reaction is relaxed by valve adjustment, and the discharge gas is generally passed through a cooling condenser. The solvent, such as methanol, thus condensed is returned to the reaction vessel, and the gaseous fraction, such as carbon dioxide, alone can thus be eliminated.

Available as the method of eliminating (A) after the production are, for example, the method comprising adsorption treatment using silica gel, activated carbon, activated alumina, a special molecular sieve or the like absorbent, for instance, the method comprising elimination by recrystallization, and the method comprising extraction with a solvent. The adsorption treatment method, recrystallization method and extraction method may be carried out independently and individually, or may be carried out in combination.

From the electrochemical stability viewpoint, the water content in the electrolyte is preferably not higher than 300 ppm, more preferably not higher than 100 ppm, particularly preferably not higher than 50 ppm.

The electrochemical capacitor of the invention uses the above-mentioned electrolyte according to the invention as the electrolyte thereof. The electrochemical capacitor comprises electrodes, current collectors and a separator and, optionally, further comprises a case, a gasket and other members used in capacitors in general. The electrodes and separator are impregnated with the above-mentioned electrolyte. Among such electrochemical capacitors, the one in which a polarizable electrode(s), for example activated carbon or the like, is(are) used as the electrode(s) is an electric double layer capacitor. An aluminum electrolytic capacitor has a structure such that it comprises an oxide layer to serve as a dielectric substance as formed on an aluminum foil, which is to serve as an electrode, by electrochemical treatment and another aluminum foil to serve as another electrode, with an electrolytic paper impregnated with an electrolyte as sandwiched between them.

The main component of the polarizable electrode is preferably a carbonaceous material which is electrochemically inert to the electrolyte and has an appropriate level of electric conductivity, and at least one of the positive and negative electrodes comprises a carbonaceous material, as mentioned above. A porous carbonaceous material having a specific surface area of not smaller than 10 $m^2/g$ as determined by the BET nitrogen adsorption method is more preferred in view of its large electrode interface for charge accumulation. The specific surface area of the porous carbonaceous material is selected according to the desired electrostatic capacity per unit area ($F/m^2$) considering the decrease in bulk density as resulting from increasing the specific surface area, and the specific surface area as determined by the BET nitrogen adsorption method is preferably 30 to 2,500 $m^2/g$. Activated carbon species having a specific surface area of 300 to 2,300 $m^2/g$ are more preferred since they are large in electrostatic capacity per volume.

Useful as the raw material for activated carbon manufacture are plant-derived substances such as wood, sawdust, coconut shells, and pulping waste liquors; fossil fuel-based substances such as coal, heavy petroleum oils, and substances derived therefrom by pyrolysis, for example coal- or petroleum-derived pitches, coal cokes, carbon aerogels, and tar pitches; synthetic polymer substances such as phenol resins, furan resins, polyvinyl chloride resins, polyvinylidene chloride resins, polyimide resins, polyamide resins, and waste plastics; waste tires, and various other species. These materials are carbonized and then activated by the gas activation method or chemical activation method. The gas activation method is also referred to as physical activation and comprises bringing the carbonized materials into contact with steam, carbon dioxide, oxygen, some other oxidizing gas or the like, for reaction therewith at high temperatures to give activated carbon species. The chemical activation method comprises uniformly impregnating the raw materials with an activating chemical and heating them in an inert atmosphere for causing dehydration and oxidation reactions involving the chemical to give activated carbon species. The chemical to be used includes zinc chloride, phosphoric acid, sodium phosphate, calcium chloride, potassium sulfide, potassium hydroxide, sodium hydroxide, potassium carbonate, sodium sulfate, potassium sulfate, calcium carbonate, and the like. Either of the methods mentioned above may be used in producing the active carbons to be used in the practice of the invention.

Among such activated carbons, those activated carbons obtained from carbonized coconut shells, coal, or phenol resins by the gas activation method are suited for use in the practice of the invention since they show a relatively high electrostatic capacity, can be mass-produced on a commercial scale and are inexpensive. As regards the chemical activation method, those activated carbons obtainable by chemical activation using potassium hydroxide are preferred since they tend to be large in electrostatic capacity, although the cost of production thereof is higher as compared with the steam activation method. The activated carbons after activation treatment may be subjected to heat treatment in an inert atmosphere, such as nitrogen, argon, helium, or xenon, generally at 500 to 2,500° C., preferably 700 to 1,500° C. to eliminate unnecessary functional groups from their surface, develop the crystallinity of carbon and thereby increase the electronic conductivity.

The activated carbons have various shapes such as ground, granular or granulated, fibrous, felt-like, woven fabric-like or sheet-like. All shapes can be used in the practice of the invention. In the case of a granular carbonaceous material, the average grain size is preferably not larger than 30 μm, since the electrode bulk density is improved and the internal resistance is reduced.

The polarizable electrode which mainly comprises the above-mentioned carbonaceous material is generally constituted of the carbonaceous material, a conductive agent and a binder substance. The electrode can be formed in the manner known in the art. For example, it is obtainable by adding polytetrafluoroethylene to a mixture of the carbonaceous material and acetylene black and, after mixing, subjecting the mixture to press forming. Alternatively, it can be obtained in the form of a sintered body by molding a mixture composed of the carbonaceous material and a binder substance, such as pitch, tar or a phenol resin, followed by heat treatment in an inert atmosphere. It is also possible to produce a polarizable electrode by sintering the carbonaceous material alone without using any conductive agent or binder. The electrode may be in the form of a thin coated film on the substrate surface, a sheet-like or plate-like molded product or a plate-like molded product made of a composite.

The conductive agent to be used in the above electrode includes, as preferred species, carbonaceous conductive agents such as carbon black species, e.g. acetylene black and Ketjen black, natural graphite, thermally expanded graphite, and carbon fibers; metal oxides such as ruthenium oxide and titanium oxide; and metal fibers such as aluminum and nickel fibers. One or two or more of such species can be used. Acetylene black and Ketjen black are particularly preferred, since small amounts thereof can efficiently improve the conductivity.

The level of addition of the conductive agent in the electrode may vary depending on the carbonaceous material species and the shape thereof. When the carbonaceous material is activated carbon, for instance, the level of addition thereof relative to activated carbon may vary depending on the bulk density of the activated carbon; for retaining the electrode at a required level of electrostatic capacity and reducing the internal resistance, that level is preferably 5 to 50% by weight, particularly preferably 10 to 30% by weight, relative to activated carbon.

Preferred as the binder substances are polytetrafluoroethylene, polyvinylidene fluoride, fluoroolefin copolymer crosslinked polymers, polyvinyl alcohol, polyacrylic acid, carboxymethylcellulose, polyimides, phenol resins, petroleum pitch, and coal pitch. One or two or more of such species can be used.

The level of addition of the binder substance in the electrode may vary depending on the carbonaceous material species and the shape thereof. When the carbonaceous material is activated carbon, for instance, that level is preferably 0.5 to 30% by weight, particularly preferably 2 to 30% by weight, relative to activated carbon.

The current collectors are not particularly restricted but may be made of any electrochemically and chemically corrosion resistant materials. For example, stainless steel, aluminum, titanium, tantalum and the like, are suited for use as positive electrode current collectors; stainless steel, aluminum, nickel, copper and the like, are suitably used as negative electrode current collectors.

The separator is not particularly restricted but preferably is made of a material which is thin and shows high electronic insulation property and ionic permeability. Thus, for example, nonwoven fabrics made of polyethylene, polypropylene or the like, papers made of viscose rayon or natural cellulose and the like can be adequately used.

The electrochemical capacitor of the invention may have a coin shape, a winding structure, or a square shape. The electrolyte for electrochemical capacitors of the invention can be applied to any types of electric double layer capacitor or any types of aluminum electrolytic capacitor.

BEST MODE FOR CARRYING OUT THE INVENTION

The following examples illustrate the present invention more specifically. These examples are, however, by no means limitative of the scope of the invention. In the following, "part(s)" means "part(s) by weight", unless otherwise specified.

EXAMPLE 1

A stainless steel autoclave equipped with a cooling condenser was charged with 96 parts of 1-ethylimidazole, 135 parts of dimethyl carbonate and 192 parts of methanol. The mixture was uniformly dissolved, and then heated to 130° C. to start the reaction. The reaction was carried out at a pressure of about 7 kg/cm$^2$ for 60 hours. The pressure, which was initially 4.5 kg/cm$^2$, gradually increased with the generation of carbon dioxide. Thus, gas purging was carried out through the top of the cooling condenser properly to adjust the pressure at about 7 kg/cm$^2$ or below. After cooling, the reaction fluid was analyzed by NMR, which indicated the disappearance of 1-ethylimidazole and the formation, in almost quantitative yield, of 1-ethyl-3-methylimidazolium monomethyl carbonate. 423 parts of the thus obtained 1-ethyl-3-methylimidazolium monomethyl carbonate/methanol/dimethyl carbonate solution was placed in a flask, and 209 parts of an aqueous solution of fluoroboric acid (pure substance content 42% by weight) was added dropwise thereto with stirring at room temperature over about 30 minutes. With the dropwise addition, carbon dioxide bubbles formed. After completion of the dropwise addition and after the bubble formation became quiet, the reaction fluid was transferred to a rotary evaporator and the solvent was totally distilled off. 198 parts of colorless and transparent liquid remained in the flask. This liquid was analyzed by $^1$H-NMR, $^{13}$C-NMR and HPLC and, as a result, it was found that the content of 1-ethyl-3-methylimidazolium tetrafluoroborate (hereinafter abbreviated as EMI.BF$_4$) was 98 mole % and the total content of 1-ethyl-3-methylimidazolium-4-carboxyl anion betaine, 1-ethyl-3-methylimidazolium-5-carboxyl anion betaine, 1-ethyl-3-methylimidazolium-4-carboxyl anion betaine-5-carboxylic acid and 1-ethyl-3-methylimidazolium-5-carboxyl anion betaine-4-carboxylic acid (hereinafter abbreviated as a mixture (A-1)) was 2 mole %. The measurement conditions in the HPLC analysis were as described above. The same shall apply in the subsequent examples and comparative examples. The whole amount of the salt obtained (198 g) was dissolved in propylene carbonate to give a total volume of 1 liter. An electrolyte was thus prepared.

EXAMPLE 2

The reaction procedure of Example 1 was performed under the same conditions as in Example 1 except that gas purging was carried out to adjust the reaction pressure to 4.5 kg/cm$^2$. The salt obtained was analyzed by HPLC. The content of EMI.BF$_4$ was 99 mole % and the total content of the mixture (A-1) was 1 mole %. The whole amount of the salt obtained (198 g) was dissolved in propylene carbonate to give a total volume of 1 liter. An electrolyte was thus prepared.

EXAMPLE 3

40 parts of activated carbon was added to 198 parts of the salt obtained in Example 2 and, after 8 hours of stirring at room temperature, the whole amount of the activated carbon was filtered off using a fine filter paper 5C (manufacturer: Advantec Co., Ltd., No.: 5C). HPLC analysis of the salt obtained revealed that the content of EMI.BF$_4$ was 99.5 mole % and the total content of the mixture (A-1) was 0.5 mole %. The whole amount of the salt obtained (198 g) was dissolved in propylene carbonate to give a total volume of 1 liter. An electrolyte was thus prepared.

EXAMPLE 4

40 parts of activated carbon was again added to 198 parts of the salt obtained in Example 3 and, after 8 hours of stirring at room temperature, the whole amount of the activated carbon was filtered off using a fine filter paper 5C. HPLC analysis of the salt obtained revealed that the content of EMI.BF$_4$ was 99.9 mole % and the total content of the mixture (A-1) was 0.1 mole %. The whole amount of the salt obtained (198 g) was dissolved in propylene carbonate to give a total volume of 1 liter. An electrolyte was thus prepared.

EXAMPLE 5

40 parts of activated carbon was again added to 198 parts of the salt obtained in Example 4 and, after 8 hours of stirring at room temperature, the whole amount of the activated carbon was filtered off using a fine filter paper 5C. HPLC analysis of the salt obtained revealed that the content of EMI.BF$_4$ was 99.99 mole % and the total content of the mixture (A-1) was 0.01 mole %. The whole amount of the salt obtained (198 g) was dissolved in propylene carbonate to give a total amount of 1 liter. An electrolyte was thus prepared.

EXAMPLE 6

An electrolyte was prepared by dissolving 198 g of the salt obtained in Example 4 in acetonitrile to give a total volume of 1 liter.

EXAMPLE 7

An electrolyte was prepared by dissolving 198 g of the salt obtained in Example 4 in sulfolane to give a total volume of 1 liter.

EXAMPLE 8

The reaction procedure of Example 1 was performed under the same conditions as in Example 1 except that the reaction temperature was changed to 150° C. Analysis of the salt obtained by $^1$H-NMR, $^{13}$C-NMR and HPLC revealed that the content of EMI.BF$_4$ was 98 mole % and the total content of 1-ethyl-3-methylimidazolium-4-(OCO$_2^-$) betaine, 1-ethyl-3-methylimidazolium-5-(OCO$_2^-$) betaine, 1-ethyl-3-methylimidazolium-4-(OCO$_2^-$) betaine-5-(OCO$_2$H) and 1-ethyl-3-methylimidazolium-5-(OCO$_2^-$) betaine-4-(OCO$_2$H) (hereinafter abbreviated as a mixture (A-2)) was 2 mole %. The whole amount of the salt obtained (198 g) was dissolved in propylene carbonate to give a total volume of 1 liter. An electrolyte was thus prepared.

EXAMPLE 9

The reaction procedure of Example 1 was performed under the same conditions as in Example 1 except that the reaction temperature was changed to 140° C. Analysis of the salt obtained by $^1$H-NMR, $^{13}$C-NMR and HPLC revealed that the content of EMI.BF$_4$ was 98 mole % and the total content of 1-ethyl-3-methylimidazolium-4-carboxyl anion betaine, 1-ethyl-3-methylimidazolium-5-carboxyl anion betaine, 1-ethyl-3-methylimidazolium-4-carboxyl anion betaine-5-carboxylic acid, 1-ethyl-3-methylimidazolium-5-carboxyl anion betaine-4-carboxylic acid, 1-ethyl-3-methylimidazolium-4-(OCO$_2^-$)betaine, 1-ethyl-3-methylimidazolium-5-($OCO_2^-$)betaine, 1-ethyl-3-methylimidazolium-4-($OCO_2^-$)betaine-5-($OCO_2H$) and 1-ethyl-3-methylimidazolium-5-($OCO_2^-$)betaine-4-($OCO_2H$) (hereinafter abbreviated as a mixture (A-3)) was 2 mole %. The whole amount of the salt obtained (198 g) was dissolved in propylene carbonate to give a total volume of 1 liter. An electrolyte was thus prepared.

EXAMPLE 10

The procedure of Example 1 was performed under the same conditions as in Example 1 except that the amount of methanol charged was changed to 96 parts. HPLC analysis of the salt obtained revealed that the content of $EMI.BF_4$ was 93 mole % and the total content of the mixture (A-1) was 7 mole %. The whole amount of the salt obtained (198 g) was dissolved in propylene carbonate to give a total amount of 1 liter. An electrolyte was thus prepared.

EXAMPLE 11

An electrolyte was prepared by dissolving 198 g of the salt obtained in Example 10 in acetonitrile to give a total volume of 1 liter.

EXAMPLE 12

An electrolyte was prepared by dissolving 198 g of the salt obtained in Example 10 in sulfolane to give a total volume of 1 liter.

COMPARATIVE EXAMPLE 1

The procedure of Example 1 was performed under the same conditions as in Example 1 except that the amount of methanol charged was changed to 61 parts. HPLC analysis of the salt obtained revealed that the content of $EMI.BF_4$ was 89 mole % and the total content of the mixture (A-1) was 11 mole %. The whole amount of the salt obtained (198 g) was dissolved in propylene carbonate to give a total amount of 1 liter. An electrolyte was thus prepared.

COMPARATIVE EXAMPLE 2

An electrolyte was prepared by dissolving 198 g of the salt obtained in Comparative Example 1 in acetonitrile to give a total volume of 1 liter.

COMPARATIVE EXAMPLE 3

An electrolyte was prepared by dissolving 198 g of the salt obtained in Comparative Example 1 in sulfolane to give a total volume of 1 liter.

COMPARATIVE EXAMPLE 4

The procedure of Example 1 was performed under the same conditions as in Example 1 except that the amount of methanol charged was changed to 51 parts. HPLC analysis of the salt obtained revealed that the content of $EMI.BF_4$ was 85 mole % and the total content of the mixture (A-1) was 15 mole %. The whole amount of the salt obtained (198 g) was dissolved in propylene carbonate to give a total amount of 1 liter. An electrolyte was thus prepared.

The contents of other impurities in all the electrolytes used in Examples 1 to 12 and Comparative Examples 1 to 4 were at the following levels. Water of not more than 10 ppm, tertiary amines and tertiary amine salts of not higher than 1 mmole/kg, $BF_4^-$ hydrolysates of not higher than 100 ppm, hydrosilicofluoric acid and hydrosilicofluoric acid salts of not higher than 1 ppm, sulfuric acid and sulfuric acid salts of not higher than 1 ppm, hydrogen fluoride and fluoride salts of not higher than 1 ppm, glycol of not higher than 10 ppm, chlorohydrin of not higher than 10 ppm, and lithium, sodium, magnesium, potassium, calcium, chromium, manganese, iron, cobalt, nickel, copper, zinc and lead ion contents each of not higher than 0.1 ppm.

The acid to base ratio in each of the electrolytes used in Examples 1 to 12 and Comparative Examples 1 to 4 was acid/base=1.000.

Winding structured electric double layer capacitors (size: ø 18 mm×L 40 mm, rated voltage: 2.3 V) were manufactured using the electrolytes of Examples 1 to 12 and Comparative Examples 1 to 4 as shown in Table 1. Using these winding structured electric double layer capacitors, withstand voltages of the electrolytes were evaluated by measuring self-discharge characteristics. The residual voltages after self-discharge are shown in Table 1.

The method used for measuring the self-discharge characteristics is described in the following. Each winding structured electric double layer capacitor manufactured as above was charged at 2.5 V at room temperature for 24 hours and allowed to stand at room temperature for 50 hours, and the winding structured electric double layer capacitor was then measured for the voltage between terminals. The voltage between terminals after 24 hours as found by that measurement was taken as the residual voltage. The higher the residual voltage is, the higher the withstand voltage is; the lower the residual voltage is, the lower the withstand voltage is.

Capacity Retention

Using the above winding structured electric double layer capacitors, high-temperature load tests were carried out at 70° C. at 2.5 V. The capacity retentions after the lapse of 1,000 hours are shown in Table 1.

Capacity retention (%)={(capacity after 1,000 hours)/(initial capacity)}×100

The capacity measurement method is now described. Each winding structured electric double layer capacitor was charged at room temperature at 2.5 V for 1 hour, followed by constant-current discharge at 500 mA using a constant-current loading apparatus. The capacity was calculated from the time required for the voltage between terminals of the winding structured electric double layer capacitor to change from 1.5 V to 1.0 V. As for the method of capacity calculation, the relation Q=i×t=C×V gives the relation C=i×Δt/ΔV. In the present measurement, the following values were used: i=0.5 (A) and ΔV=1.5−1.0=0.5 (V). In the above formula, Q is the amount of electric charge discharged (C), i is the discharge current (A), t is the discharge time (sec), C is the capacity (F), and V is the voltage (V)

TABLE 1

| | Electrolyte | Content of cyclic amidinium salt derivatives (A) (mol %) | Residual voltage (V) | Capacity retention (%) |
|---|---|---|---|---|
| Example 1 | EMI · $BF_4$/PC | 2 | 2.3 | 90 |
| Example 2 | EMI · $BF_4$/PC | 1 | 2.35 | 92 |
| Example 3 | EMI · $BF_4$/PC | 0.5 | 2.45 | 94 |

TABLE 1-continued

| | Electrolyte | Content of cyclic amidinium salt derivatives (A) (mol %) | Residual voltage (V) | Capacity retention (%) |
|---|---|---|---|---|
| Example 4 | EMI · BF$_4$/PC | 0.1 | 2.4 | 95 |
| Example 5 | EMI · BF$_4$/PC | 0.01 | 2.4 | 96 |
| Example 6 | EMI · BF$_4$/AN | 0.1 | 2.35 | 94 |
| Example 7 | EMI · BF$_4$/SL | 0.1 | 2.2 | 96 |
| Example 8 | EMI · BF$_4$/PC | 2 | 2.3 | 90 |
| Example 9 | EMI · BF$_4$/PC | 2 | 2.3 | 90 |
| Example 10 | EMI · BF$_4$/PC | 7 | 1.95 | 82 |
| Example 11 | EMI · BF$_4$/AN | 7 | 1.8 | 78 |
| Example 12 | EMI · BF$_4$/SL | 7 | 1.95 | 85 |
| Compar. Ex. 1 | EMI · BF$_4$/PC | 11 | 1.7 | 76 |
| Compar. Ex. 2 | EMI · BF$_4$/AN | 11 | 1.7 | 75 |
| Compar. Ex. 3 | EMI · BF$_4$/SL | 11 | 1.7 | 76 |
| Compar. Ex. 4 | EMI · BF$_4$/PC | 15 | 1.55 | 72 |

PC: Propylene carbonate
AN: Acetonitrile
SL: Sulfolane

While the electric double layer capacitors described in the above examples of the invention, namely Examples 1 to 12, have winding structures, the electrolytes can produce the same effects when applied to electric double layer capacitors having another structure, e.g. a coin or laminate shape, as obtained in Examples 1 to 12 of the invention.

INDUSTRIAL APPLICABILITY

The electrolyte of the invention is low in the content of contaminant cyclic amidinium salt derivatives (A), hence is excellent in withstand voltage and capacity retention. Since the electrolyte produces such effects as mentioned above, electrochemical capacitors containing said electrolyte are suited for use as memory backup means in various electronic devices, as backup power sources for various power supply sources, as storage batteries to serve as substitutes for secondary batteries such as storage elements used in combination with solar cells, as power sources for high current-requiring motors, as power sources for power tools such as electric tools, and as power supply sources for electric vehicles.

The invention claimed is:

1. An electrolyte for an electrochemical capacitor comprising a cyclic amidinium salt (B) represented by the general formula (1),
wherein the total amount of a cyclic amidinium salt derivative (A) represented by the general formula (2) is not larger than 10 mole % relative to the sum of (A) and (B):

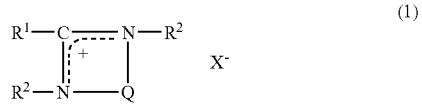

[In the formula, R$^1$ represents a hydrogen atom or a hydrocarbon group containing 1 to 20 carbon atoms, which may optionally have a hydroxyl group(s), R$^2$ represents a hydrocarbon group containing 1 to 10 carbon atoms, which may optionally have a hydroxyl group, amino group, nitro group, cyano group, formyl group and/or ether bond-containing group(s), and the two R$^2$ groups may be the same or different, Q represents an alkylene, arylene or alkenylene group containing 2 to 10 carbon atoms, which may optionally have a hydrocarbon group containing 1 to 5 carbon atoms, an amino, nitro, cyano or formyl group(s), and X$^-$ represents a counter anion; the part or whole of the R$^1$ and R$^2$ moieties may be bound together to form a ring];

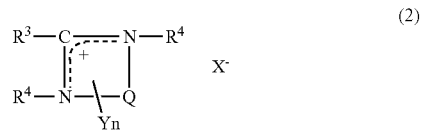

[In the formula, R$^3$ represents a hydrogen atom or a hydrocarbon group containing 1 to 20 carbon atoms, which may be substituted with a hydroxyl group(s), R$^4$ represents a hydrocarbon group containing 1 to 10 carbon atoms, which may have a hydroxyl, amino, nitro, cyano, formyl and/or ether bond-containing group(s), and the two R$^4$ groups may be the same or different; Q represents an alkylene, arylene or alkenylene group containing 2 to 10 carbon atoms, which may optionally have a hydrocarbon group containing 1 to 5 carbon atoms, an amino, nitro, cyano or formyl group(s), and there are cases where there is X$^-$ or there is no X$^-$ and, when there is X$^-$, it represents a counter anion, and each Y represents a carboxyl group or an —OCO$_2$H and, when there is no X$^-$, each Y represents a carboxyl group, a carboxyl anion group, an —OCO$_2$H or —CO$_2^-$ group and one Y represents a carboxyl anion or an —OCO$_2^-$ group; n represents an integer of 1 to 20; the part or whole of the R$^3$ and R$^4$ moieties may be bound together to form a ring].

2. The electrolyte for an electrochemical capacitor according to claim 1, which is producible by dissolving said cyclic amidinium salt (B) in a solvent.

3. The electrolyte for an electrochemical capacitor according to claim 2, wherein Q is a —CH═CH— group.

4. The electrolyte for an electrochemical capacitor according to claim 3,
wherein the anion X$^-$ in (A) or (B) is an ion selected from the group consisting of PF$_6^-$, BF$_4^-$, AsF$_6^-$, SbF$_6^-$, N(RfSO$_2$)$_2^-$, C(RfSO$_2$)$_3^-$ and RfSO$_3^-$ (Rf representing a fluoroalkyl group containing 1 to 12 carbon atoms).

5. The electrolyte for an electrochemical capacitor according to claim 4,
wherein the solvent comprises, as the main component, at least one species selected from the group consisting of propylene carbonate, ethylene carbonate, butylene carbonate, sulfolane, 3-methylsulfolane, acetonitrile, dimethyl carbonate, ethyl methyl carbonate and diethyl carbonate.

6. The electrolyte for an electrochemical capacitor according to claim 3,
wherein the solvent comprises, as the main component, at least one species selected from the group consisting of propylene carbonate, ethylene carbonate, butylene carbonate, sulfolane, 3-methylsulfolane, acetonitrile, dimethyl carbonate, ethyl methyl carbonate and diethyl carbonate.

7. The electrolyte for an electrochemical capacitor according to claim 2,
wherein the anion X$^-$ in (A) or (B) is an ion selected from the group consisting of PF$_6^-$, BF$_4^-$; AsF$_6^-$, SbF$_6^-$, N(RfSO$_2$)$_2^-$, C(RfSO$_2$)$_3^-$and RfSO$_3^-$ (Rf representing a fluoroalkyl group containing 1 to 12 carbon atoms).

8. The electrolyte for an electrochemical capacitor according to claim 7,
wherein the solvent comprises, as the main component, at least one species selected from the group consisting of propylene carbonate, ethylene carbonate, butylene carbonate, sulfolane, 3-methylsulfolane, acetonitrile, dimethyl carbonate, ethyl methyl carbonate and diethyl carbonate.

9. The electrolyte for an electrochemical capacitor according to claim 2,
wherein the solvent comprises, as the main component, at least one species selected from the group consisting of propylene carbonate, ethylene carbonate, butylene carbonate, sulfolane, 3-methylsulfolane, acetonitrile, dimethyl carbonate, ethyl methyl carbonate and diethyl carbonate.

10. The electrolyte for an electrochemical capacitor according to claim 1, wherein Q is a —CH=CH— group.

11. The electrolyte for an electrochemical capacitor according to claim 10,
wherein the anion $X^-$ in (A) or (B) is an ion selected from the group consisting of $PF_6^-$, $BF_4^-$, $AsF_6^-$, $SbF_6^-$, $N(RfSO_2)_2^-$, $C(RfSO_2)_3^-$ and $RfSO_3^-$ (Rf representing a fluoroalkyl group containing 1 to 12 carbon atoms).

12. The electrolyte for an electrochemical capacitor according to claim 11,
wherein the solvent comprises, as the main component, at least one species selected from the group consisting of propylene carbonate, ethylene carbonate, butylene carbonate, sulfolane, 3-methylsulfolane, acetonitrile, dimethyl carbonate, ethyl methyl carbonate and diethyl carbonate.

13. The electrolyte for an electrochemical capacitor according to claim 10,
wherein the solvent comprises, as the main component, at least one species selected from the group consisting of propylene carbonate, ethylene carbonate, butylene carbonate, sulfolane, 3-methylsulfolane, acetonitrile, dimethyl carbonate, ethyl methyl carbonate and diethyl carbonate.

14. The electrolyte for an electrochemical capacitor according to claim 1,
wherein the anion $X^-$ in (A) or (B) is an ion selected from the group consisting of $PF_6^-$, $BF_4^-$, $AsF_6^-$, $SbF_6^-$, $N(RfSO_2)_2^-$, $C(RfSO_2)_3^-$ and $RfSO_3^-$ (Rf representing a fluoroalkyl group containing 1 to 12 carbon atoms).

15. The electrolyte for an electrochemical capacitor according to claim 14,
wherein the solvent comprises, as the main component, at least one species selected from the group consisting of propylene carbonate, ethylene carbonate, butylene carbonate, sulfolane, 3-methylsulfolane, acetonitrile, dimethyl carbonate, ethyl methyl carbonate and diethyl carbonate.

16. The electrolyte for an electrochemical capacitor according to claim 1,
wherein the solvent comprises, as the main component, at least one species selected from the group consisting of propylene carbonate, ethylene carbonate, butylene carbonate, sulfolane, 3-methylsulfolane, acetonitrile, dimethyl carbonate, ethyl methyl carbonate and diethyl carbonate.

17. An electrochemical capacitor having a polarizable electrode impregnated with an electrolyte
which contains the electrolyte for an electrochemical capacitor according to claim 1 as the electrolyte, and
in which at least one of the positive and negative electrodes is a polarizable electrode comprising a carbonaceous material as the main component.

18. The electrochemical capacitor according to claim 17,
wherein the carbonaceous material is activated carbon.

19. An electric double layer capacitor having a polarizable electrode impregnated with an electrolyte
which is producible by using the electrolyte for an electrochemical capacitor according to claim 1 as the electrolyte.

* * * * *

UNITED STATES PATENT AND TRADEMARK OFFICE
CERTIFICATE OF CORRECTION

PATENT NO. : 7,099,146 B2
APPLICATION NO. : 10/522237
DATED : August 29, 2006
INVENTOR(S) : Yukiya Kobayashi et al.

It is certified that error appears in the above-identified patent and that said Letters Patent is hereby corrected as shown below:

In the Claims

Claim 1, Column 18, line 30, " $-CO_2-$ group " should be -- $-OCO_2-$ group--.

Signed and Sealed this

Twenty-seventh Day of February, 2007

JON W. DUDAS
*Director of the United States Patent and Trademark Office*